(12) United States Patent
Klug et al.

(10) Patent No.: US 11,661,351 B2
(45) Date of Patent: May 30, 2023

(54) WATER TREATMENT SYSTEM AND METHOD

(71) Applicant: Wilton Water Solutions LLC, Waseca, MN (US)

(72) Inventors: George Peter Klug, New Richland, MN (US); Bruce William Quast, Waseca, MN (US); William Russel Parker, Idaho Falls, ID (US)

(73) Assignee: Wilton Water Solutions LLC, Waseca, MN (US)

( * ) Notice: Subject to any disclaimer, the term of this patent is extended or adjusted under 35 U.S.C. 154(b) by 16 days.

(21) Appl. No.: 16/844,974

(22) Filed: Apr. 9, 2020

(65) Prior Publication Data
US 2020/0325039 A1 Oct. 15, 2020

Related U.S. Application Data

(60) Provisional application No. 62/831,597, filed on Apr. 9, 2019.

(51) Int. Cl.
| | |
|---|---|
| *C02F 1/00* | (2006.01) |
| *C02F 1/74* | (2023.01) |
| *C02F 103/20* | (2006.01) |

(52) U.S. Cl.
CPC ............... *C02F 1/005* (2013.01); *C02F 1/74* (2013.01); *C02F 2103/20* (2013.01); *C02F 2303/04* (2013.01)

(58) Field of Classification Search
CPC ...... C02F 1/00; C02F 1/74; C02F 1/46; C02F 1/72

See application file for complete search history.

(56) References Cited

U.S. PATENT DOCUMENTS 10,974,212 B1 * 4/2021 Guoin ............... B01F 25/43161

FOREIGN PATENT DOCUMENTS

| CN | 108290126 A | * | 7/2018 | ............ B01F 5/0696 |
| IN | 201641001382 A | * | 7/2021 | |

* cited by examiner

*Primary Examiner* — Walter D. Griffin
*Assistant Examiner* — Cameron J Allen
(74) *Attorney, Agent, or Firm* — Christensen, Fonder, Dardi & Herbert PLLC; William E. Anderson

(57) ABSTRACT

A structuring assembly for structuring water in a water treatment system. The structuring assembly comprising a body portion, a tubular first layer defining an interior channel for passage of water, a plurality of structuring bodies positioned in the channel and a dampening layer positioned about the first tubular layer. In application in the water treatment system, as water passes through the channel and over the structuring bodies, dissolved oxygen content of the water is increased.

15 Claims, 9 Drawing Sheets

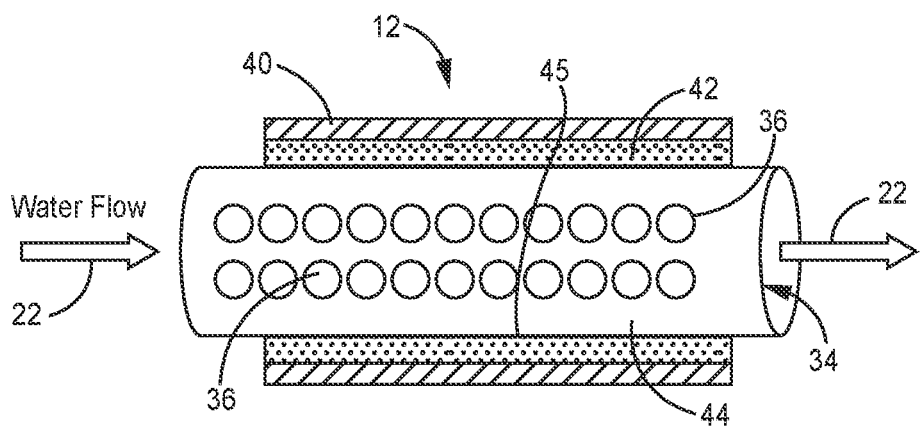
FIG. 4C
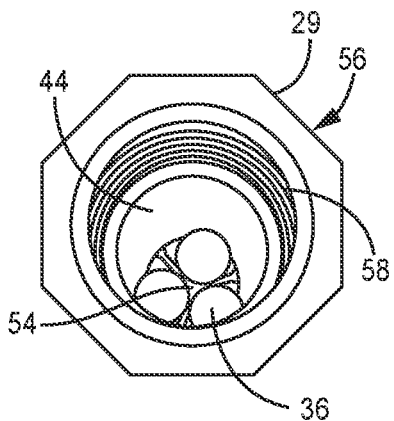
FIG. 5A
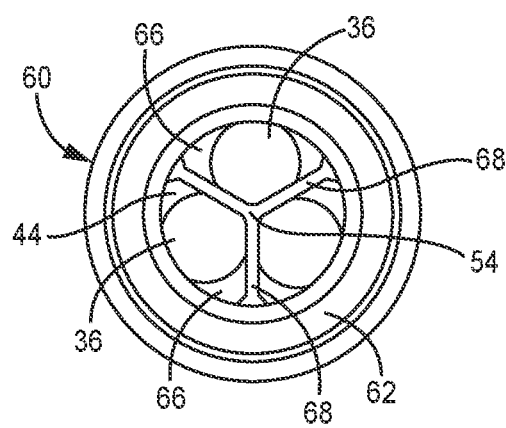
FIG. 5B
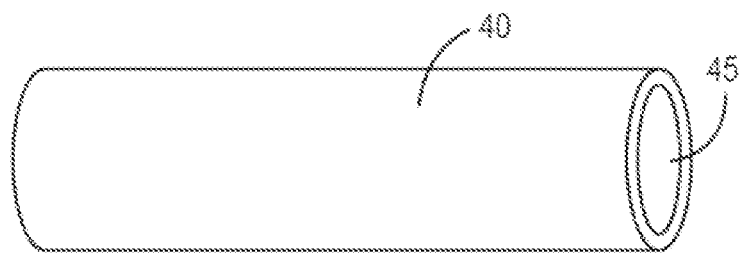
FIG. 6
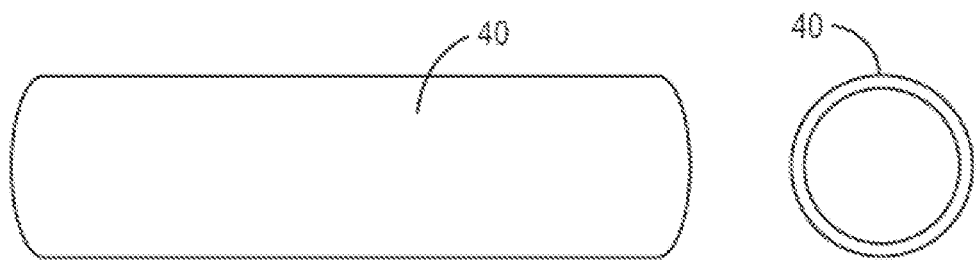

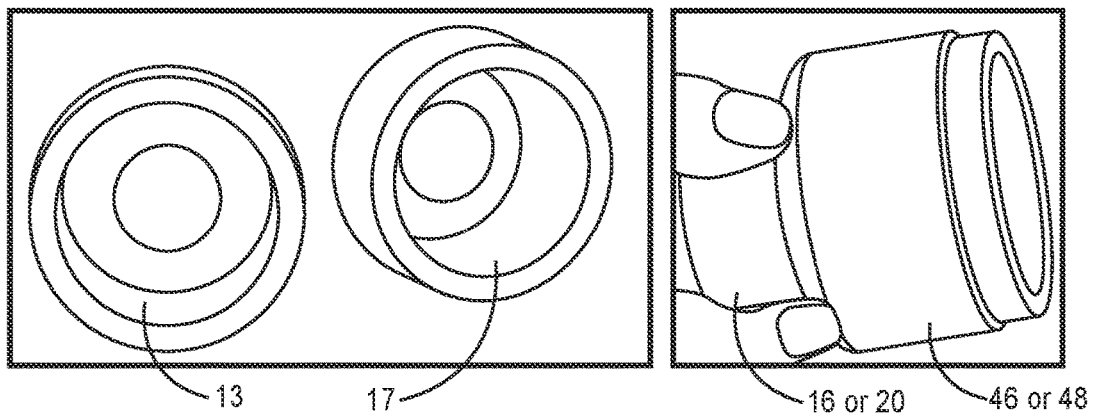
FIG. 7
FIG. 8
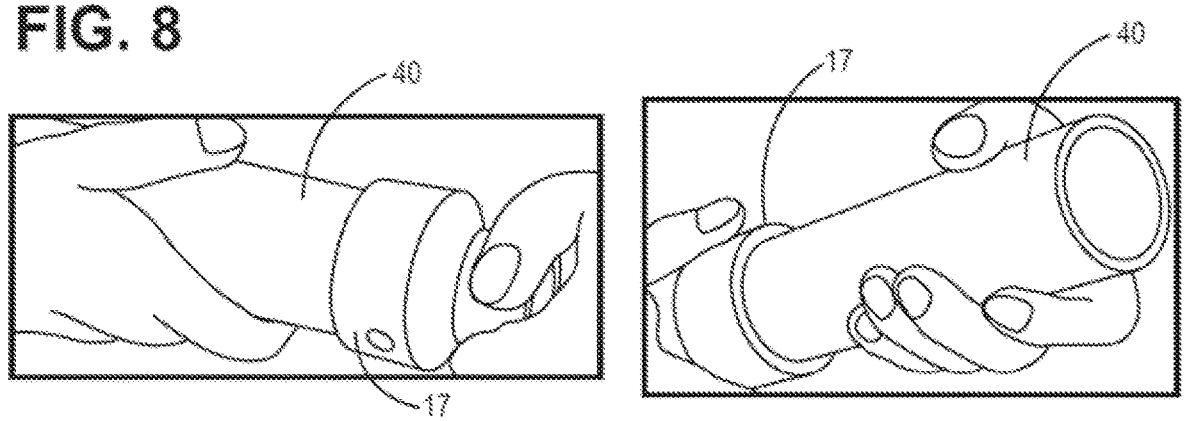
FIG. 9
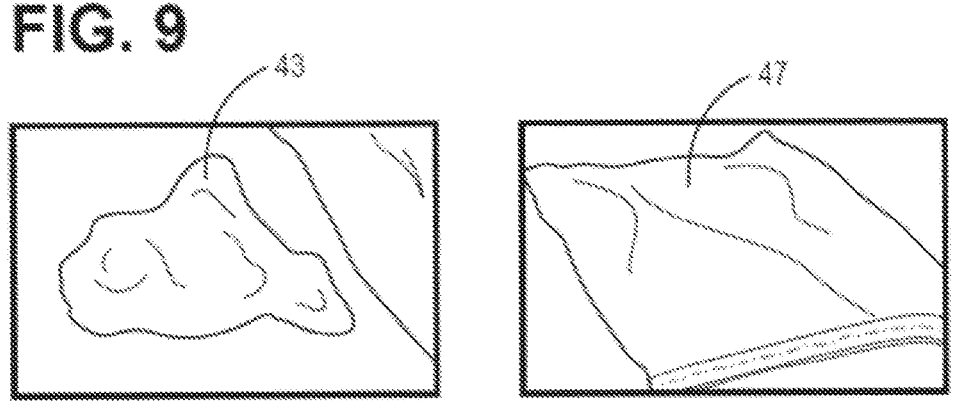

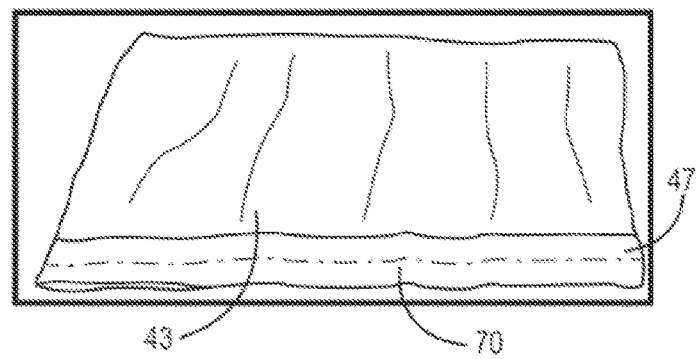
FIG. 10
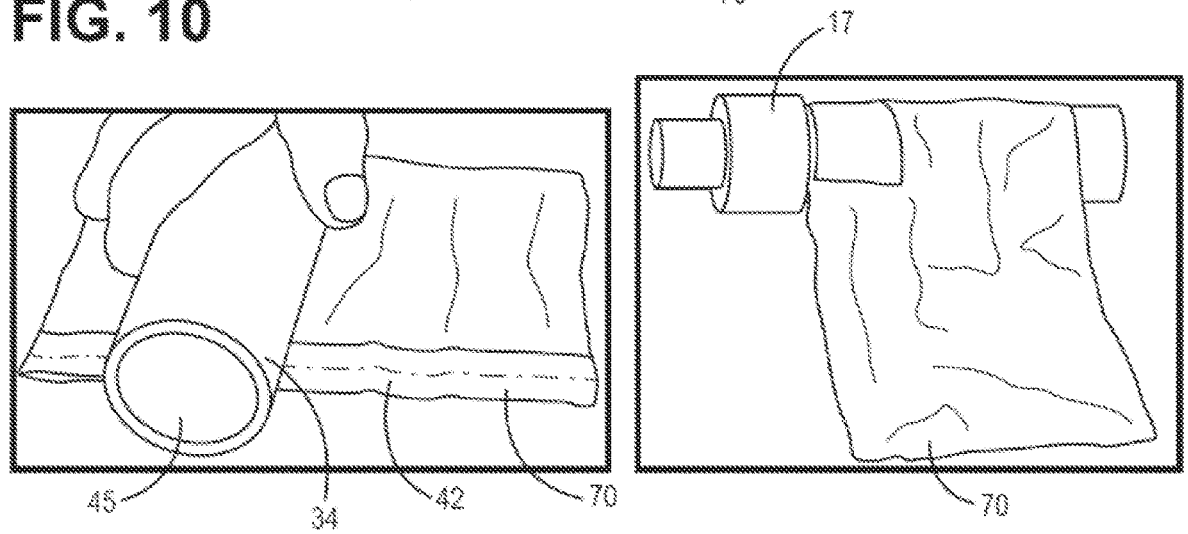
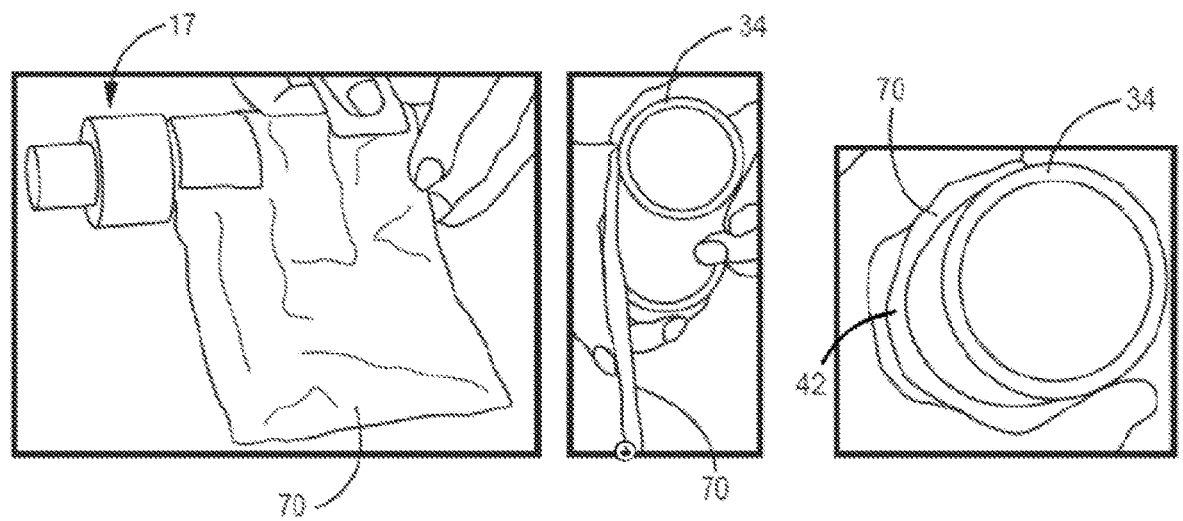

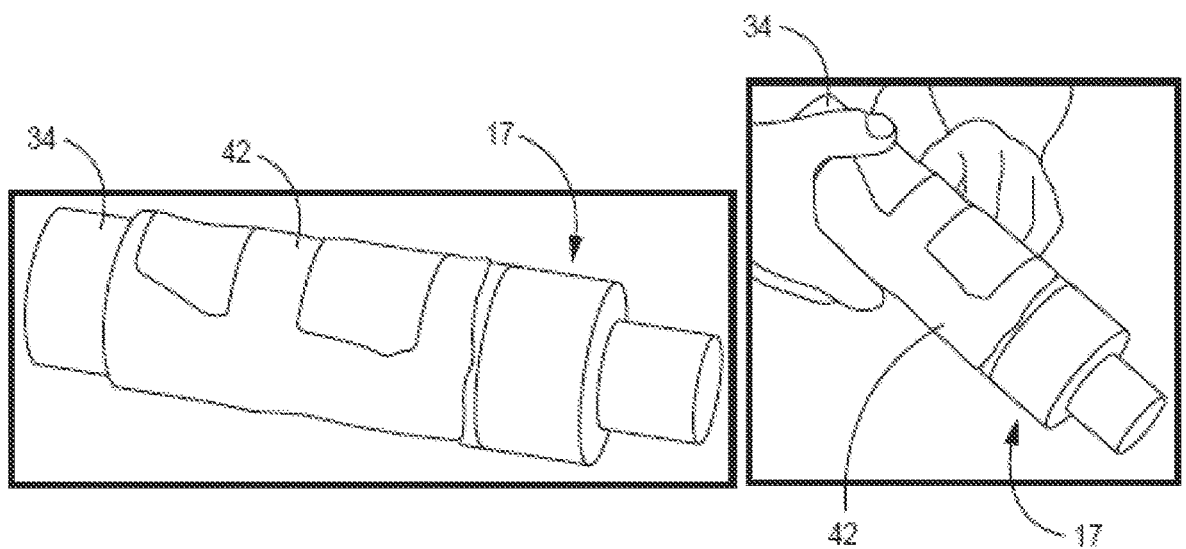
FIG. 11
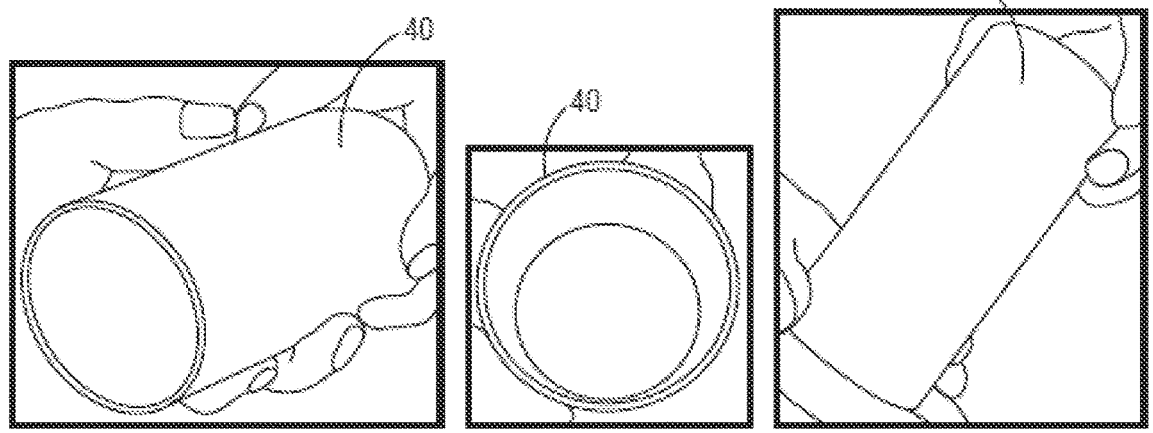
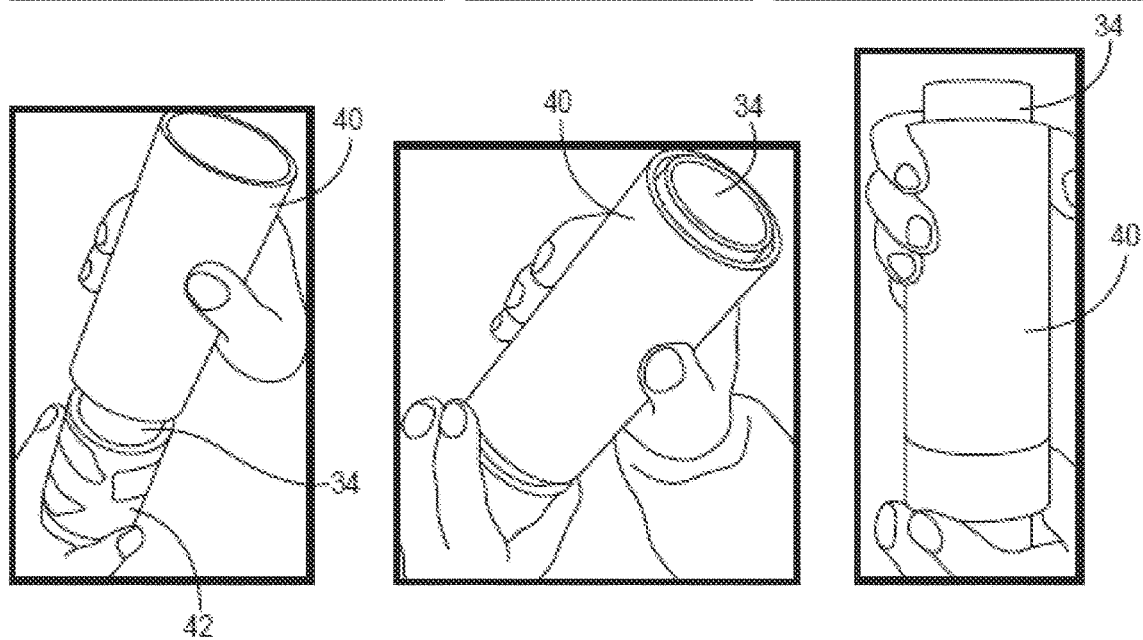

WATER TREATMENT SYSTEM AND METHOD

CROSS-REFERENCE TO RELATED APPLICATIONS

This application claims the benefit of U.S. Provisional Patent Application Ser. No. 62/831,597 entitled "WATER TREATMENT SYSTEM AND METHOD", filed Apr. 9, 2019, which is incorporated herein by reference in its entirety.

FIELD OF INVENTION

The present disclosure relates to water treatment devices, systems and methods for treating water utilizing aspects of water structuring.

BACKGROUND

Stagnant bodies of water produce bacteria, invasive algae and low levels of oxygen availability, creating a harmful environment for the existing inhabitants. Water treatment systems have been utilized in an effort to clean polluted or contaminated small, natural bodies of water to improve environmental conditions. Aerators are widely used to try and keep a lake or pond from freezing out (low oxygen condition that causes fish to die). Some aerators are simply big propellers that move the water or porous air lines that use compressed air, forcing hundreds of thousands of bubbles into the water. Such systems influence the oxygen reading of the water but have not been effective enough to attain the desired results in reducing toxic bacteria, invasive algae, and increases in oxygen availability.

Any improvements in water treatment systems would be welcomed by the industry. Any improvements in increasing the dissolved oxygen in water, raising oxygen availability, as compared to conventional structuring systems, without the use of chemicals or filtration, would be further welcomed by the industry. It would further be desirous to provide a water treatment system that would fit multiple applications of varying flows and pressures, including the ability to take water directly from a natural body of water and pass the water through the water treatment system and return the treated water to the same natural body of water.

SUMMARY

In embodiments, a water treatment system for structuring water to increase oxygen content within bodies of water. In embodiments, the treatment system may comprise a water structuring assembly having an intake and an outlet and configured to pass water flow along a passageway from the intake to the outlet. The water structuring assembly may comprise a body portion, wherein the body portion may include a first tubular layer defining a channel coaxially aligned with the passageway, a plurality of structuring bodies positioned in the channel and a dampening layer positioned about the first tubular layer. The system may further include a pump configured to create a water flow between the intake and the outlet. In embodiments, as water passes through the channel and over the structuring bodies, dissolved oxygen content of the water is increased.

In embodiments, the structuring bodies may comprise a nonmagnetic solid stainless-steel material and the dampening layer may comprise a harmonic dampening material. In at least some embodiments, the harmonic dampening material may comprise ground up granite rock, shale, metal filings or mixtures thereof. In an embodiment, the dampening layer comprises a stainless-steel tube or the like.

In embodiments, the body portion may further comprise a tubular second layer positioned about the dampening layer. The tubular second layer may be formed of stainless-steel or copper.

In embodiments, the first layer may be formed of a solid plastic material, which may include polyvinyl chloride.

In an embodiment, a method of treating water comprising pumping or receiving water through an intake of a water treatment system and thereafter structuring the water by passing the water flow through a water structuring assembly. The water structuring assembly may, include at least one tubular first layer wrapped with a dampening layer and a plurality of structuring metal objects positioned in the tube. In application, water flowing in the tube passes around the structuring objects; and out through an outlet of the water treatment system, effectuating an increase in dissolved oxygen content of the water.

In embodiments, the structuring bodies may comprise a nonmagnetic solid stainless-steel material and the dampening layer may comprise a harmonic dampening material. The harmonic dampening material may include ground up granite rock, shale, metal filings or mixtures thereof or may comprise a stainless-steel tube or the like.

In embodiments of the method, the body portion may further comprise a tubular second layer positioned about the dampening layer. The tubular second layer may be formed of stainless-steel or copper. The first layer may further be formed of a solid plastic material, which may include polyvinyl chloride.

In an embodiment, a method of treating water comprising pumping water through a channel defined by a first layer of a body portion of a structuring assembly. The body portion comprises a plurality of structuring masses formed of solid metal bodies positioned in the channel and a dampening or tuning layer wrapped around the first layer and positioned radially about the structuring masses, Pass water through the channel and over the structuring masses enables the water to lower its surface tension, thereby raising oxygen availability in the water.

Embodiments further include, a structuring assembly for structuring water comprising a body portion, the body portion comprising a tubular first layer defining an interior channel for passage of water and housing a plurality of structuring bodies positioned in the channel and a dampening layer positioned about the first tubular layer. As water passes through the channel and over the structuring bodies, dissolved oxygen content of the water is increased.

In embodiments, the interior channel is defined by an inner surface of the first layer that is substantially cylindrical in shape; the structuring bodies may comprise a nonmagnetic solid stainless-steel material; the dampening layer may comprise a harmonic dampening material, and wherein the harmonic dampening material may be ground up granite rock, shale, metal filings or mixtures thereof or a stainless-steel tube or the like. The body portion may further comprise a tubular second layer positioned about the dampening layer, wherein the tubular second layer may be formed of stainless-steel or copper. The first layer may be formed of a solid plastic material, which may include polyvinyl chloride.

In embodiments, the dampening material of the dampening layer of the structuring assembly may comprises about 50% powdered granite and about 50% powdered stainless-steel filings and the structuring bodies are nonmagnetic spheres of stainless-steel In embodiments, the water treatment system may comprise a pump configured to move water between the intake and the outlet.

A feature and advantage of embodiments is a water treatment system and method that utilizes various aspects of water structuring to produce cleaner and healthier water.

A feature and advantage of embodiments is that the water structuring system and assembly increases the dissolved oxygen in water, raising oxygen availability, as compared to conventional structuring systems. In embodiments, a further feature and advantage is that dissolved oxygen content increases without the use of chemicals or filtration.

A feature and advantage of embodiments is that the water structuring system and assembly may be constructed to fit multiple applications of varying flows and pressures.

A feature and advantage of embodiments includes the ability to take water directly from a natural body of water and pass the water through the water treatment system and return the treated water to the same natural body of water.

The above summary of the various representative embodiments is not intended to describe each illustrated embodiment or every implementation of the invention. Rather, the embodiments are chosen and described so that others skilled in the art can appreciate and understand the principles and practices of the invention.

BRIEF DESCRIPTION OF THE DRAWINGS

The drawings included in the present application are incorporated into, and form part of, the specification. They illustrate embodiments of the present disclosure and, along with the description, serve to explain principles of the disclosure. The drawings are only illustrative of certain embodiments and do not limit the disclosure.

FIGS. 1C-2B are side perspective views of water structuring assemblies in accordance with an embodiment of the invention.

FIG. 4C is a graphic representation showing a side cross-sectional view of a body portion in accordance with an embodiment of the invention.

FIG. 5A is a proximal end perspective view of a water structuring assembly with a connection adapter in accordance with an embodiment of the invention.

FIG. 5B is a distal end perspective view of a water structuring assembly in accordance with an embodiment of the invention.

FIG. 6 shows line drawings of various digital photo images of an inner layer of a water structuring assembly in accordance with an embodiment of the invention.

FIG. 7 shows line drawings of various digital photo images of end portions of a water structuring assembly in accordance with an embodiment of the invention.

FIG. 8 shows line drawings of various digital photo images of a stage of assembly of a water structuring assembly in accordance with an embodiment of the invention.

FIG. 9 shows line drawings of various digital photo images of a stage of assembly of a dampening layer of a water structuring assembly in accordance with an embodiment of the invention.

FIG. 10 shows line drawings of various digital photo images of stages of assembly of a water structuring assembly in accordance with an embodiment of the invention.

FIG. 11 shows line drawings of various digital photo images of stages of assembly of a water structuring assembly in accordance with an embodiment of the invention.

Figure 1A:
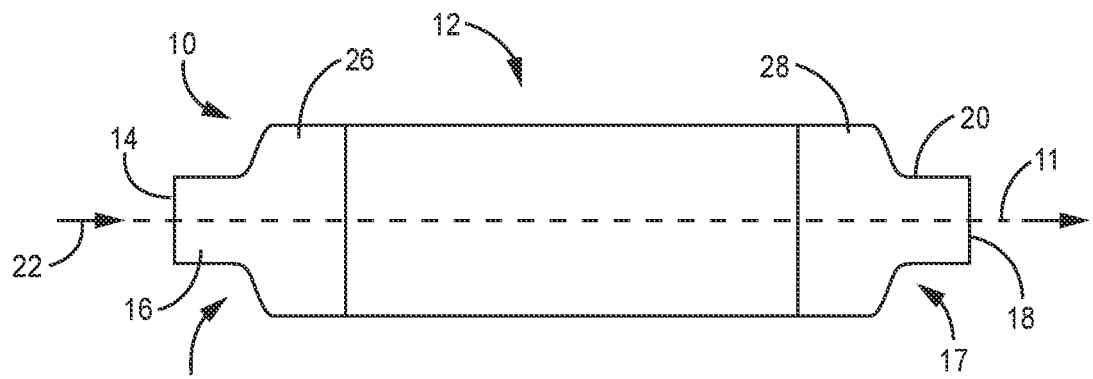
FIGS. 1A-1B are side views of a water structuring assembly in accordance with an embodiment of the invention.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 1B:
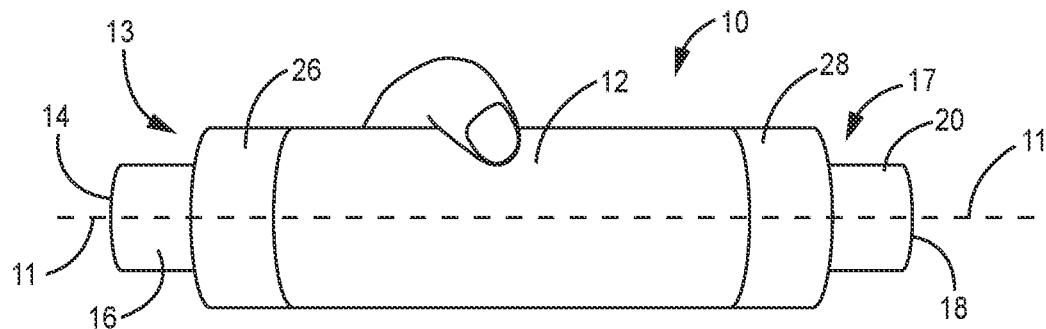
Figure 1C:
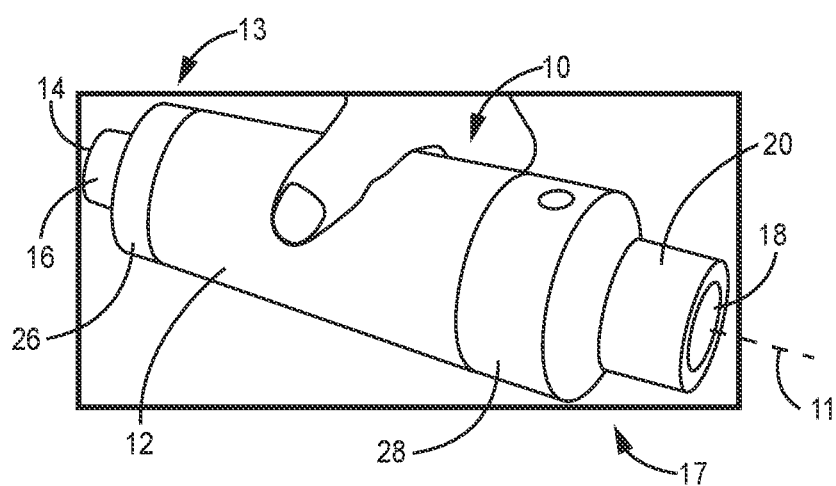

Referring to FIGS. 1A-1C, in embodiments, a water structuring assembly 10 having an axis 11 and a body portion 12 axially positioned between a first or proximal end portion 13 and a second or distal end portion 17. The proximal end portion 13 may include an entry or intake portion 16 having an opening 14 at a proximal end and the distal end portion 17 may include an exit, outtake or outlet portion 20 having an opening 18 at a distal end. The structuring assembly 10 may further include a passageway 22, through which fluids may travel from the intake opening 14 to the outlet opening 18.

In embodiments, the proximal end portion 13 may comprise a first or proximal collar portion 26 sized and configured to connect to a proximal end of the body portion 12 and the distal end portion 17 may comprise a second or distal collar portion 28 sized and configured to connect to a distal end of the body potion 12. The intake and outtake portions 16, 20, of the proximal and distal end portions 13, 17, respectively, may be reduced in cross-sectional size relative to the respective collar portions 26, 28, to suitably facilitate connection and fluid communication with the fluid intake source and outtake setup. The first and second collar portions 26, 28, may be integral with or connected to the intake and outlet portions 18, 20, respectively.

Figure 2A:
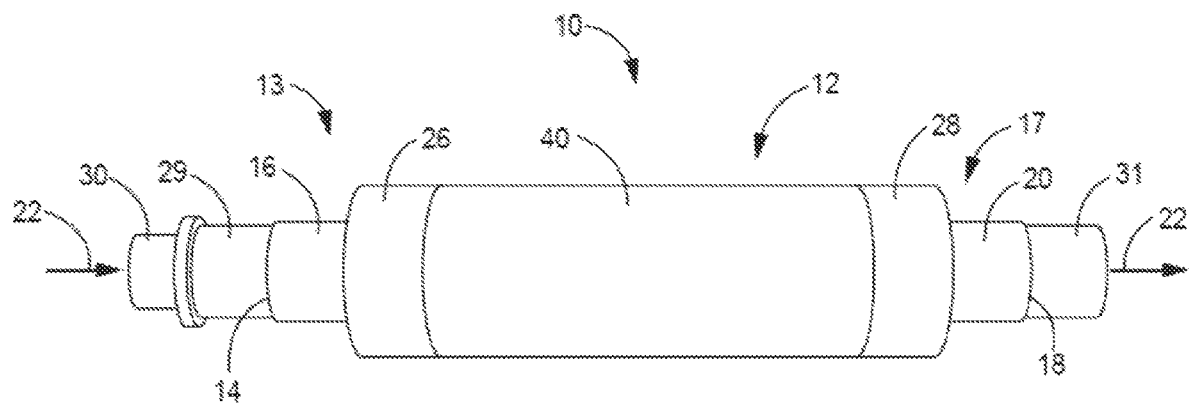

In embodiments, the intake portion 16 may be connected to a fluid source for receiving the fluid through the intake opening 14. Referring to FIG. 2A, the intake portion 16 may include a connection mechanism, such as a threaded portion or adapter 29, for connection to a fluid intake conduit 30. In embodiments, the fluid flow may exit through the outlet opening 18 into the body of water from which the fluid was drawn. The system may include an extender or fluid outtake conduit 31 connected to the outtake portion 20 of the assembly and in fluid communication with the exit or outlet opening 18 for diversion of the fluid to a desired location. The system may further include a connection mechanism, such as a threaded portion or adapter, for connection to the fluid outtake conduit. In some embodiments, the connection mechanism may be male and female threading.

Figure 3A:
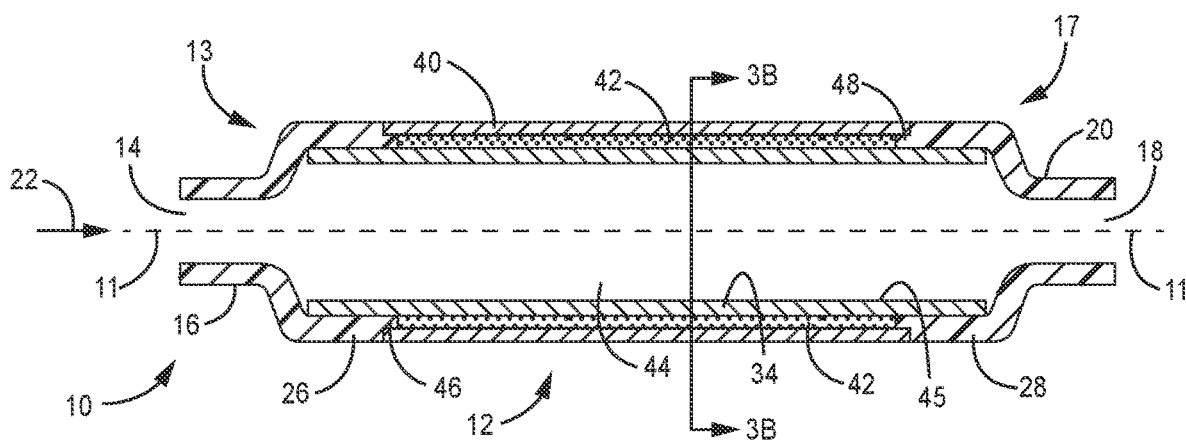
FIG. 3A is an axial cross-sectional view of a water structuring assembly in accordance with an embodiment of the invention.
Figure 3B:
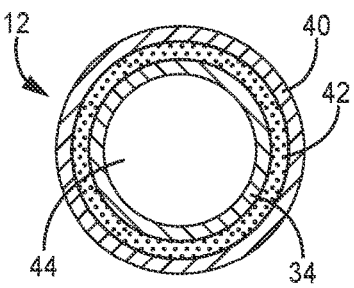
FIG. 3B is a radial cross-sectional view of the water structuring assembly shown in FIG. 3A along lines 3B-3B.
Figure 4A:
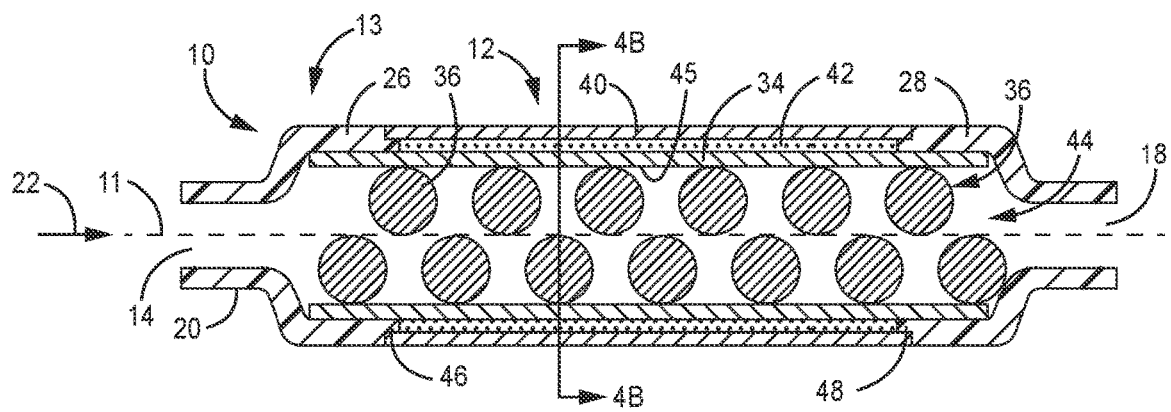
FIG. 4A is an axial cross-sectional view of a water structuring assembly in accordance with an embodiment of the invention.
Figure 4B:
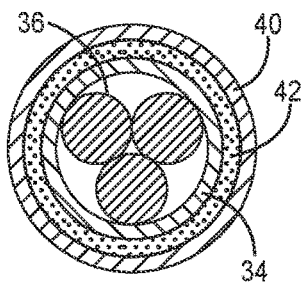
FIG. 4B is a radial cross-sectional view of the water structuring assembly shown in FIG. 3A along lines 4B-4B.
Figure 4D:
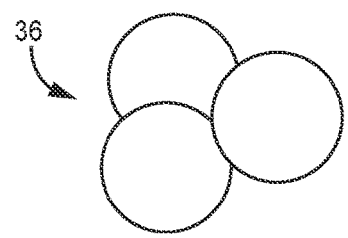
FIG. 4D is a line drawing of digital photo image of structuring bodies in accordance with an embodiment of the invention.

Referring to FIGS. 3A-3B, an axially aligned cross-section and a radially aligned cross-section of a structuring assembly 10 is shown. In embodiments, the structuring assembly 10 may include a body portion 12, which may be tubular is shape, defining at least a portion of the fluid pathway 22. The body portion 12 may comprise a first layer 34, a second layer 40, which may be an outer sleeve, and a dampening layer 42 oriented between the first 34 and second 40 layers. In embodiments, first layer 34 may have an inner surface 45 that defines a channel 44, wherein the channel 44 may be coextensive with at least a portion of the passageway 22. In embodiments, the inner surface may be substantially cylindrical in shape. In embodiments, the body portion 12 may be tubular in shape. In embodiments, the outer 34 and inner 40 layers may be tubular in shape. In embodiments, the dampening layer 40 may also be generally tubular in shape. In at least some embodiments, the outer and inner layers 34, 40, and the dampening layer 40 may be tubular in shape.

As shown in FIG. 3A, proximal and distal ends of the inner layer 34 may be positioned within at least a portion of the proximal and distal end portions 13, 17, respectively. In embodiments, the proximal and distal ends of the inner layer 34 may be coupled to the proximal and distal end portions 13, 17, which may be via friction fit. In embodiments, proximal and distal ends of the outer layer 40 may be coupled to the proximal and distal end portions 13, 17. The proximal and distal end portions 13, 17, may each include an inwardly directed reduced end portion 46, 48, having a reduced outer diameter sized for receiving and coupling to the proximal and distal ends of the outer layer 40. The coupling may be a friction fit. The dampening layer 42 is positioned between the inner layer 34 and outer layer 40.

Referring to FIGS. 4A-4D, the structuring assembly 10 further comprises a plurality of structuring bodies 36 positioned within the channel 44. In embodiments, the plurality of structuring bodies 36 may substantially fill the channel. The plurality of structuring bodies may be housed with the first layer 34.

Figure 2B:
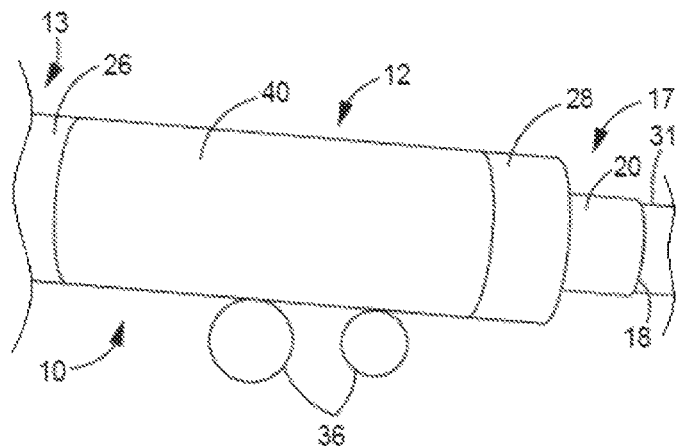

In embodiments, the structuring bodies 36 may have an exterior surface that is curved or rounded. In at least some embodiments, structuring bodies 36 are substantially spherical in shape. In an embodiment, the body portion 12 may include structuring bodies of various sizes, for example the structuring bodies 36 shown in FIG. 2B. In various embodiments, a ¾" assembly 10 may use 0.371" structuring bodies 36 (balls); a 1" assembly 10 may use 0.900" structuring bodies 36 (balls); 2" assembly 10 may use 1.375" structuring bodies 36 (balls).

In embodiments, the structuring bodies 36 are nonmagnetic masses formed from a metal material. In some embodiments, the structuring bodies 36 are formed of nonmagnetic stainless-steel. An example of suitable structuring bodies 36 includes stainless-steel nonmagnetic (SSNM) balls. In embodiments, the structuring bodies 36 may be 316 grade stainless-steel balls (non-magnetic).

Referring to FIGS. 5A-5B, in an embodiment, the assembly may include a first or proximal end portion 56 defining a first or proximal opening 58 and a second or distal end portion 60 defining a second or distal opening 62. The first 58 and second 62 openings being in fluid communication via the channel 44. The proximal end portion 56 may include a sealing portion, which may comprise internal threading, for sealing of the assembly for fluid intake.

In embodiments, the water treatment assemblies herein may comprise a limiter 54 positioned in the channel 44 at the second or distal end portion 60. The limiter 54 is sized and positioned to prevent advancement of the structuring bodies 36 further down the passageway 22.

In embodiments, the limiter 54 defines openings 66 sized to allow fluid flow, but prevent passage of the structuring bodies 36. In some embodiments, the limiter 54 comprises a plurality arms 68 radially extending from a common point and secured inside of the channel 44.

Assembly of Water Structuring Assembly:

Referring to FIGS. 6-13, in embodiments, assembly of a water structure assembly and parts and features thereof may include, but is not limited to, the following:

Providing a first or inner layer 34. As shown in FIG. 6, the inner layer 34 may be tubular in shape. In embodiments, the first layer 34 may be formed of or comprise a rigid material, such as, but not limited to, a solid plastic. In some embodiments, the rigid material is or comprises polyvinyl chloride (PVC). Examples of suitable material includes Schedule 40 PVC pipe.

Providing first 13 and second 17 end portions. As seen in FIG. 7, each end portion may comprise a collar portion, 26, 28, defining an opening for receiving and coupling to an end of the inner layer 34 and an inlet or outlet portion of reduced diameter. The collar portions 26, 28, may include a reduced end portion, 46, 48, for receiving and coupling with the inner surface 45 of the outer layer 40, as discussed above. Each end portion 13, 17, includes an opening at each end for fluid flow and coupling. The end portions 13, 17, may be formed of or comprise a rigid material, such as, but not limited to, a solid plastic.

In embodiments, as illustrated in FIG. 8, an end of the inner layer 34 may be inserted into a collar portion opening of an end portion (13 or 17). The inner diameter of the collar opening and outer diameter of the inner layer 34 may size to provide an interference fit. In embodiments, the inner layer may be adhered to the collar portion (26 or 28).

In embodiments, a dampening layer 42 comprising dampening material 43 may be prepared. In embodiments, the dampening layer 42 may comprise harmonic dampening material.

In embodiments, the harmonic dampening material 43 may comprise inert aggregates and/or metals. The harmonic dampening material may be fully or partially in powder form. In an embodiment, the harmonic dampening material comprises inert aggregates and/or metals ground to a powder form. In at least some embodiments, the harmonic dampening material 43 may comprise ground up granite rock, shale, metal filings, such as stainless-steel metal filings, ground up powderized metal filings or mixtures thereof. In an embodiment, the dampening material comprises about 50% powdered granite and about 50% powdered stainless-steel filings, for example 304 SS filings.

The dampening material 43 may be prepared by wetting a quantity of the material 43, transferring it to a flexible bag or container 47 and rolling the material in the flexible bag or container 47. In embodiments, the container 47 may be sealable and the material 43 may be rolled or flattened such that it forms a pad, as illustrated in FIG. 9. In embodiments, the dampening pad 70 may have a thickness of about ⅛ inch. In some embodiments, the thickness may be about 0.124 inch. In embodiments, the width and length of the dampening pad 70 should be measured and sized to wrap around the body portion 12 of the inner layer 34, axially inside of the end portions 13, 17, when secured to the ends of the inner layer 34.

In embodiments, as illustrated in FIG. 10, the dampening pad 70 may be wrapped around the body portion 12 of the inner layer 34 inside of the end portion (13 or 17). As shown, the pad 70 may be secured to the inner layer using tape, adhesive or other suitable means. In embodiments, the pad 70 may be tightly wrapped and secured to the inner layer 34.

As illustrated in FIG. 11 an outer layer 40 may then be provided and positioned over the dampening layer 42. This may be done by sliding the outer layer 40 over the dampening layer 42 and inner layer 34, such that the leading end of the outer layer 40 reaches the collar portion of the end portion (13 or 17). The outer layer 40 may be secured or coupled to the collar portion (26 or 28) via an interference fit between the inner wall of the outer layer 40 and the reduced portion (46 or 48) of the end portion.

In embodiments, the second layer 40 may be used to protect the inner components of the body portion 12, including the dampening layer 42. The second layer 40 may be formed of or comprise a rigid and watertight material, such as, but not limited to, a metal material. In some embodiments, the rigid material is or comprises stainless-steel or copper. Examples of suitable material include copper or stainless-steel shielding, schedule 40 stainless-steel pipe and the like.

Figure 12:
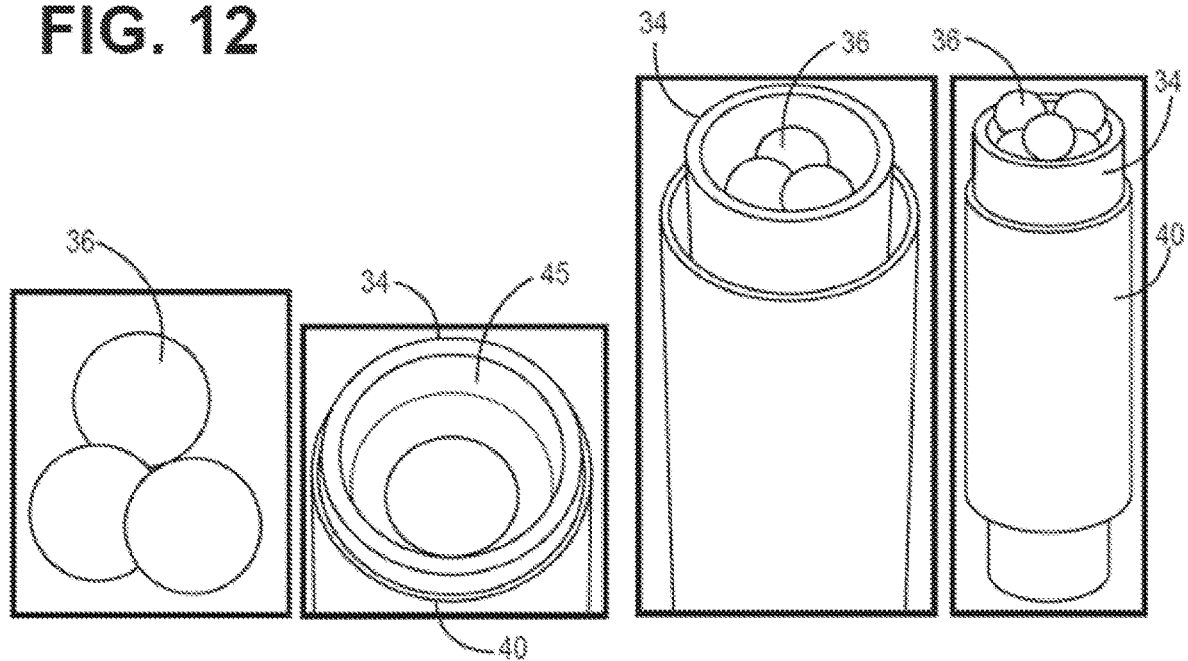
FIG. 12 shows line drawings of various digital photo images of a stage of assembly of a water structuring assembly in accordance with an embodiment of the invention.

As illustrated in FIG. 12, a plurality of structuring bodies 36 may be inserted into the open end (14 or 18) of the inner layer 34. In embodiments, structuring bodies 36 are stacked against the closed end or limiter 54, if included. In embodiments, structuring bodies 36 may be inserted to fill the channel. In at least some embodiments, the structuring bodies 36 are stacked randomly. In one embodiment, the structuring bodies are stacked in columns. In an embodiment, the structuring bodies 36 are spherical and are placed in the channel 44 of the inner layer 34 such that they are arranged in radial layers of 3 bodies per layer, as illustrated in FIG. 12. The structuring bodies 36 and inner layer 34 may be sized such that the bodies 36 stack snugly in this manner (layers of three bodies 36 per layer.

Figure 13:
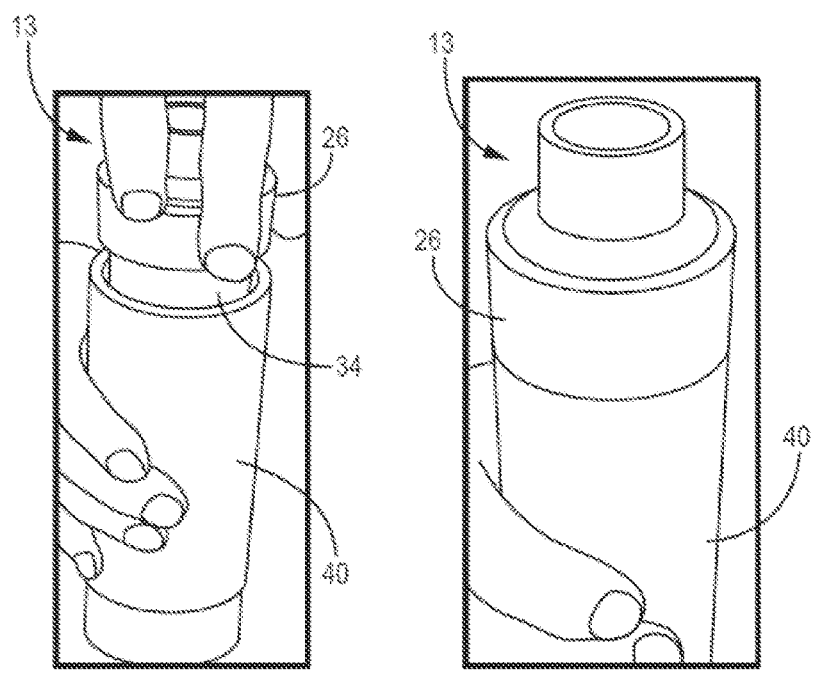
FIG. 13 shows line drawings of various digital photo images of a stage of assembly of a water structuring assembly and an assembled water structuring assembly in accordance with an embodiment of the invention.
Figure 14:
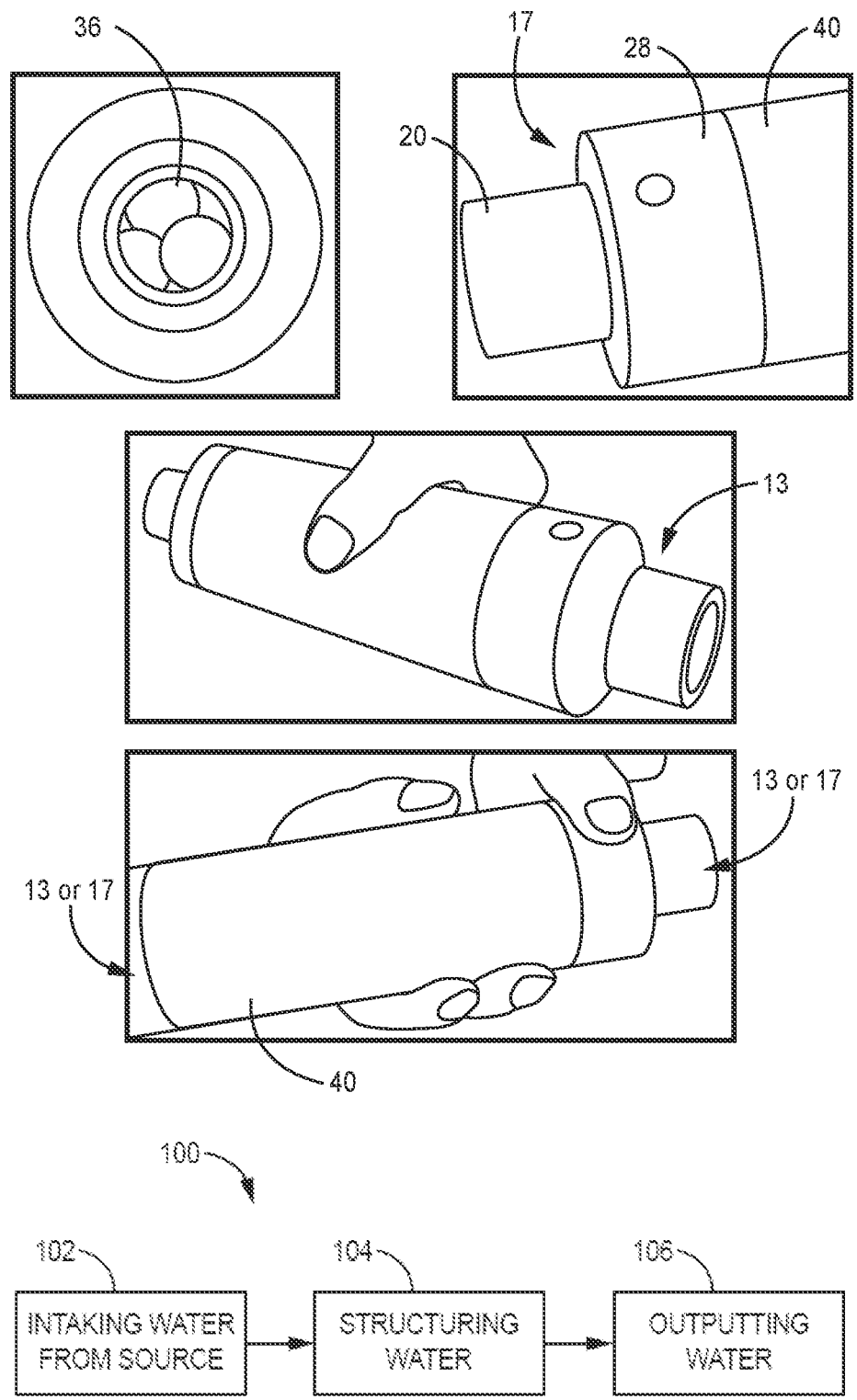
FIG. 14 is a schematic flow diagram of a method of water treatment in accordance with an embodiment of the invention.

As illustrated in FIG. 13, the remaining end portion (13 or 17) may then be secured or coupled to the open end of the inner layer 34. As described above, the end portion may be pressed over the free end of the inner layer 34 forming a friction fit and the outer layer 40 may be pressed onto the end portion forming an interference fit with the reduced portion 48, as described above. In embodiments, the connected portions may be adhered. The resulting assembly 10 may then be coupled to a water source for flow of water through the axial passageway 22, thereby structuring and treating the water. Except for a possible pump to feed water through the structuring assembly 10, the treatment of the water is conducted without any moving parts.

In embodiments, it is believed that, as water is forced through the body portion 12, a neutralizing tone or frequency is created. The frequency may be refined or tuned by a specific amount of dampening material. Surprisingly, the combination of the structuring bodies and the dampening layer produces beneficial results, including elimination of bacteria and the raising of dissolved oxygen levels.

In an embodiment, the dampening layer material may take the form of a metal tube slid onto the first layer 34. An example of a metal tube includes, but is not limited to, a schedule 40 stainless-steel pipe.

Methods for treating water using a water structuring assembly 10 and body portion 12 is disclosed. Although the method and system may be used with fluids other than water, the description will refer to the fluid as water with the understanding that other fluids may be used rather than water.

In embodiments, a method 100 of treating water that may include the step of diverting or pumping a flow of water from a water source through an intake 14 of a water structuring assembly 10 (102). In embodiments, the water may be driven or pumped through the water structuring assembly 10 at an even, low velocity. In embodiments, water may be pumped at gallons per min. In an embodiments, utilizing a ¾" structuring assembly, water may be pumped at about 2 GPM to 8 GPM; utilizing a 1" structuring assembly, water may be pumped at about 5 GPM to 50 GPM; and utilizing a 2" structuring assembly, water may be pumped at about 40 GPM to 100 GPM.

In embodiments, the method may include creating a water flow through the water structuring assembly 10, such as by utilizing a pump. In some embodiments, moving water into the inlet 14 and through the assembly 10 may include diverting or drawing the water from a body of water, such as a natural body of water, such as a pond or lake. Drawing the water from a naturally moving flow of water, such as from a stream or river, may also be utilized. It should also be recognized that the water may be drawn from other sources such as tanks, man-made reservoirs, and other confinement structures.

In embodiments, the method 100 may further include structuring the water (104) by passing the water flow into and through the body portion 12 of the water structuring assembly 10. The water flow enters through a first or proximal opening 48 and into an inner channel 44 of the body portion 12. The inner channel 44 may be defined by an inner surface 45 that may be substantially cylindrical in shape. The structuring of the water may include passing the water flow through the channel 44 and over a plurality of structuring bodies 36 positioned in the channel 44. The water flow then exits through a second or distal opening 40 of the body portion 12.

In embodiments, after the water flow passes through the body portion 12 and over the plurality of structuring bodies 36, it may then be passed through an outlet 18 of the water structuring assembly 10 (106). In some embodiments, the method may include returning the water to the body of water from which water was originally drawn and passed into the structuring assembly 10. In this way, the condition of the water in a body of water can be improved significantly.

Methods herein including treating water by passing a water flow through the water structuring system and assembly increases the dissolved oxygen in water, raising oxygen availability, as compared to conventional structuring systems. In embodiments, a further feature and advantage is that dissolved oxygen content increases without the use of added chemicals or filtration.

In embodiments, the water treatment system may include a power source. The power source may be used to drive a pump that is in fluid communication with the fluid intake conduit 30 for drawing water into the intake 14 of the water structuring assembly 10 and through the body portion 12 along the fluid passageway 22. The power source may comprise conventional power supplies, such as utility supplied electrical power, less conventional power sources that are more portable, such as an electrical power generator operating on fuel, and/or power supplies that are able to utilize renewable power, such as solar energy and wind energy, which may be provided, for example, by solar energy panels and windmills or turbines.

In embodiments, the assemblies and methods herein may be used in conjunction with the methods and water treatment devices disclosed and described in U.S. Pat. No. 10,111,310, titled Method and means for removing static electricity from water, which is incorporated herein by reference in its entirety. The device of U.S. Pat. No. 10,111,310 may work with the assemblies disclosed herein by attracting free electrons that may be generated, providing a path out of the water.

In embodiments, a method of treating water comprising: pumping water through a channel defined by a first layer of a body portion of a structuring assembly, wherein the body portion comprises structuring masses, which may be SSNM balls, positioned in the channel and a dampening or tuning layer wrapped around the first layer and positioned radially about the structuring masses, thereby enabling the water to lower the surface tension of the water, which raises oxygen availability in the water.

In application, it is believed that the body portion 12 may reduce surface tension or magnetic attracting of the water molecules in the treated water, thereby decreasing clumping of water molecules and raising oxygen availability. It has been found that, using structuring bodies 36, such as SSNM balls, within a body portion 12 that comprises a dampening or tuning layer, and then using a pump to force water through the channel of the body portion 12 has proven to be a far superior way to raise oxygen availability. It has been found and it is believed that embodiments of systems and methods herein, at least in part enables the water to lower its surface tension, which raises oxygen availability in the water. When given a defined and precise path through the body portion 12, water itself can create a broad array of detoxifying frequencies, which substantially reduces toxic bacteria, invasive algae, and increases oxygen availability.

Testing:

A cattle tank test was conducted at Blue Earth County Soil & Water. The results are shown in Table I:

TABLE I

| | YSI Professional Plus - Handheld | | | Grab | |
|---|---|---|---|---|---|
| DAY | Nitrate (mg/L) | Temp (F.) | DO (mg/L) | PO4-P (mg/L) | T-Tube |
| Day 1 | 1.8 | 49 | 9.4 | 0.22 | 18 |
| Day 2 | 1.9 | 60 | 9.7 | 0.46 | 23 |
| Day 4 | 1.9 | 58.1 | 7.29 | 0.5 | 28 |
| Day 7 | 1.8 | 55.8 | 7.15 | 0.68 | 44 |
| Day 9 | 1.8 | 55.2 | 8.91 | 0.86 | 60 (max) |
| Day 15 | 3.9 | 52.2 | 10.67 | 0.82 | 60 (max) |

The testing demonstrates what happens with the DO. Consistently, when a water structuring assembly, as disclosed herein, is incorporated and used, the chemical oxygen demand and biochemical oxygen demand drop along with DO temporarily. As, can be seen, after five to seven days of dropping, the DO rebounds. There was a rise in ortho phosphorus and nitrates, but it should be noted that this was because they were transformed from inert to available. The nitrates became more able to volitate and the phosphorous was absorbed by plants instead of hanging in the water.

Testing of a structuring assembly, as disclosed herein, was further conducted by installing the assembly in a bay of a lake and feeding the lake water through the assembly. After about a week, there was a positive change in the water quality of the lake. Surface water samples were taken from the main body of the lake and provided to a testing laboratory for analysis. The lab analysis reflected positive physical changes in the lake water. Results are shown in Table II.

TABLE II

| Phosphorus Water Digest | As Received Result | | Method RL | Method Reference |
|---|---|---|---|---|
| Bilchemical Oxygen Demand | 51 | mg/L | 2 | SM 5210 B-97 |
| Solids, Total Suspended | 100 | mg/L | 2 | USGS I-3765-85 |
| Specific Conductance | 378.7 | umhos/cm | 0.1 | SM 2510 B-97 |
| Phosphorus, Soluble Ortho | 0.011 | mg/L | 0.005 | EPA 365.1 |
| Fecal Coliform, MF | 2100 | CFU/100 mL | 10 | SM 9222D 21ST Ed |
| Nitrate + Nitrite | 1.25 | mg/L as N | 0.05 | 353.2 |
| Phosphorus, Total | 0.535 | mg/L | 0.005 | EPA 365.1 |
| Nitrogen, Total Kjeldahl | 8.2 | mg/L | 0.2 | SM 4500 NH3 C-97 |
| Chemical Oxygen Demand | 147 | mg/L | 10 | 410.4 |

CFU = Colony Forming Units. Samples were filtered in lab for Soluble Ortho Phosphorus prior to analysis. Temperature of sample at receipt was 1.4 C.
RL = Reporting Limit; Analysis performed under Minnesota Department of Health Accreditation conform to the current TNI standards.
CERTIFICATION: MN LAB # 027-015-125; WI LAB # 999447680; ND MICRO # 1013-M; ND WW/DW # R-040.

A further sample was taken in the bay where the structuring assembly was located. The results are shown in Table III. Note should be taken of the Chemical Oxygen Demand, Biochemical Oxygen Demand and Fecal Coliform.

TABLE III

| Phosphorus Water Digest | As Received Result | | Method RL | Method Reference |
|---|---|---|---|---|
| Bilchemical Oxygen Demand | 66 | mg/L | 2 | SM 5210 B-97 |
| Solids, Total Suspended | 12 | mg/L | 2 | USGS I-3765-85 |
| Specific Conductance | 421.8 | umhos/cm | 0.1 | SM 2510 B-97 |
| Phosphorus, Soluble Ortho | 0.033 | mg/L | 0.005 | EPA 365.1 |
| Fecal Coliform, MF | 230 | CFU/100 mL | 10 | SM 9222D 21ST Ed |
| Nitrate + Nitrite | 2.38 | mg/L as N | 0.05 | 353.2 |
| Phosphorus, Total | 0.085 | mg/L | 0.005 | EPA 365.1 |
| Nitrogen, Total Kjeldahl | 1.9 | mg/L | 0.2 | SM 4500 NH3 C-97 |
| Chemical Oxygen Demand | 38 | mg/L | 10 | 410.4 |

CFU = Colony Forming Units. Samples were filtered in lab for Soluble Ortho Phosphorus prior to analysis. Temperature of sample at receipt was 1.4 C.
RL = Reporting Limit; Analysis performed under Minnesota Department of Health Accreditation conform to the current TNI standards.
CERTIFICATION: MN LAB # 027-015-125; WI LAB # 999447680; ND MICRO # 1013-M; ND WW/DW # R-040.

Features and advantages of embodiments herein over conventional systems and methods further include: 1. Neutralization or elimination of coliform bacteria; 2. Lowered chemical oxygen demand; 3. Lowered biological oxygen demand; 4. Lowered turbidity; 5. Stopped cyanobacteria blooms; 6. Creation of an environment friendly to native aquatic vegetation; 7. Creation of an unfriendly environment for invasive aquatic vegetation; improved water supply for agricultural uses.

In some embodiments, water treatment systems and methods herein may incorporate aspects of other water treatment systems and methods, including those described in U.S. Pat. No. 8,968,578, which is herein incorporated by reference in its entirety.

In embodiments, methods of structuring water may include additional steps that may comprise dividing the flow of water into at least two separate flows along at least two separate flow paths. The step of structuring the water may also include collecting the water from the separate flows and flow paths into a single flow, which may be performed after the structuring of the water.

In some embodiments, water treatment systems and methods herein may incorporate aspects of mechanical filtration, sterilization, clarification, as well as revitalization of water and biological filtration.

In embodiments, methods of treating water may further include pre-treating the water received through the intake 14. Pre-treating the water may include removing particles and other contaminants from the water, such as those particles that can be removed by filtering the water by moving the water through a filtering apparatus. The pre-treating may function to remove, for example, algae from the water.

In embodiments, methods of treating water may further include treating the water to remove or neutralize contaminants. Treating the water may include exposing the water to ultraviolet (UV) light radiation by passing the water flow through UV light radiation produced by a UV light source.

In embodiments, methods of treating water may further include adding beneficial biological components after structuring of the water. The addition of the components may be performed by a suitable injection apparatus that injects the components into the flow of the water.

Embodiments of the present invention may be further described, understood and defined with reference to and in any one of the following numbered paragraphs or in any combination of, when consistent, the following numbered paragraphs:

1. A structuring assembly for structuring water comprising a body portion, the body portion comprising a tubular first layer, wherein the tubular first layer defines an interior channel for passage of water and houses a plurality of structuring bodies positioned in the channel, and a dampening layer positioned about the first tubular layer, wherein, as water passes through the channel and over the plurality of structuring bodies, dissolved oxygen content of the water is increased.

2. The structuring assembly of paragraph 1, the plurality of structuring bodies comprising nonmagnetic masses formed from a metal material.

3. The structuring assembly of paragraphs 1-2, wherein the interior channel is defined by an inner surface of the first layer that is substantially cylindrical in shape.

4. The structuring assembly of any of the previous paragraphs, wherein the structuring bodies comprise a nonmagnetic solid stainless-steel material.

5. The structuring assembly of any of the previous paragraphs, wherein the dampening layer comprises a harmonic dampening material.

6. The structuring assembly of paragraph 5, wherein the harmonic dampening material is chosen from the group consisting of ground up granite rock, shale, metal filings and mixtures thereof.

7. The structuring assembly of any of the previous paragraphs, wherein the dampening layer comprises a stainless-steel tube.

8. The structuring assembly of any of the previous paragraphs, the body portion further comprising a tubular second layer positioned about the dampening layer.

9. The structuring assembly of any of the previous paragraphs, wherein the tubular second layer is formed of stainless-steel or copper.

10. The structuring assembly of any one of the previous paragraphs, wherein the first layer is formed of a solid plastic material.

11. The structuring assembly of paragraph 10, wherein the first layer is formed of polyvinyl chloride.

12. A water treatment system, the system comprising:
a water structuring assembly having an intake and an outlet and configured to pass water flow along a passageway from the intake to the outlet, wherein the water structuring assembly comprises:
a body portion, the body portion having a first opening oriented toward the intake and a second opening oriented toward the outlet, wherein the body portion comprises a first tubular layer defining a channel coaxially aligned with the passageway and extending between the first and second openings of the body portion, a plurality of structuring bodies positioned in the channel and a dampening layer positioned about the first tubular layer; and
a pump configured to create a water flow between the intake and the outlet, wherein, as water passes through the channel and over the structuring bodies, dissolved oxygen content of the water is increased.

13. The water treatment system of paragraph 10, the structuring bodies comprising nonmagnetic masses formed from a metal material.

14. The water treatment system of paragraph 13, wherein the structuring bodies comprise a nonmagnetic solid stainless-steel material.

15. The water treatment system of any of the previous paragraphs, wherein the dampening layer comprises a harmonic dampening material.

16. The water treatment system of any of the previous paragraphs, wherein the harmonic dampening material is chosen from the group consisting of ground up granite rock, shale, metal filings and mixtures thereof.

17. The water treatment system of any one of the previous paragraphs, wherein the dampening layer comprises a stainless-steel tube or the like.

18. The water treatment system of any of the previous paragraphs, the body portion further comprising a tubular second layer positioned about the dampening layer.

19. The water treatment system of paragraph 18, wherein the tubular second layer is formed of stainless-steel or copper.

20. The water treatment system of any of the previous paragraphs, wherein the first layer is formed of a solid plastic material.

21. The water treatment system of paragraph 20, wherein the first layer is formed of polyvinyl chloride.

22. A method of treating water, comprising:
receiving water through an intake of a water treatment system;
structuring the water by passing the water flow through a water structuring assembly, including at least one tubular first layer wrapped with a dampening layer and a plurality of structuring metal objects positioned in the tube, such that water flowing in the tube passes around the structuring objects; and
passing the water through an outlet of the water treatment system,
wherein structuring the water increases dissolved oxygen content of the water.

23. The method of paragraph 22, wherein receiving water through the intake includes taking water from a natural body of water and passing the water through the outlet includes returning the water to the same natural body of water.

24. The method of one of paragraphs 22 and 23, the structuring metal objects comprising nonmagnetic masses formed from a metal material.

25. The method of any one of paragraphs 1-2, wherein the structuring metal objects comprise a nonmagnetic solid stainless-steel material.

26. The method of any one of paragraphs 22-25, wherein the dampening layer comprises a harmonic dampening material.

27. The method of any one of the previous paragraphs, wherein the harmonic dampening material is chosen from the group consisting of ground up granite rock, shale, metal filings and mixtures thereof.

28. The method of any one of the previous paragraphs, wherein the dampening layer comprises a stainless-steel tube or the like.

29. The method of any one of the previous paragraphs, the body portion further comprising a tubular second layer positioned about the dampening layer.

30. The method of paragraph 29, wherein the tubular second layer is formed of stainless-steel or copper.

31. The method of any one of the previous paragraphs, wherein the first layer is formed of a solid plastic material.

32. The method of paragraph 31, wherein the first layer is formed of polyvinyl chloride.

33. A method of treating water comprising:
pumping water through a channel defined by a first layer of a body portion of a structuring assembly, wherein the body portion comprises a plurality of structuring masses formed of solid metal bodies positioned in the channel and a dampening or tuning layer wrapped around the first layer and positioned radially about the structuring masses, thereby enabling the water to lower the surface tension of the water, which raises oxygen availability in the water.

34. The structuring assembly, water treatment system or method of any one the previous paragraphs, where consistent, wherein the structuring bodies, structuring metal objects or solid metal bodies are nonmagnetic spheres of stainless-steel.

35. The structuring assembly, water treatment system or method of any of the previous paragraphs, where consistent, wherein dampening material of the dampening layer comprises about 50% powdered granite and about 50% powdered stainless-steel filings.

36. The structuring assembly, water treatment system or method of any of the previous paragraphs, where consistent, wherein dampening material of the dampening layer comprises about 50% powdered granite and about 50% powdered stainless-steel filings and the structuring bodies are nonmagnetic spheres of stainless-steel.

The following United States patents and patent publications are hereby incorporated by reference herein, in their entireties: U.S. Pat. Nos. 8,968,578, 6,596,163, 10,111,310, 5,174,901 and US 2011203929 are hereby incorporated by reference herein in their entireties. The subject matter and disclosure of PCT Patent Publication WO2014112701 is also incorporated herein by reference in its entirety. Components illustrated in the incorporated by reference references may be utilized with embodiments herein. Incorporation by reference is discussed, for example, in MPEP section 2163.07(B).

The above references to U.S. patents in all sections of this application are herein incorporated by references in their entireties for all purposes. Components illustrated in such patents may be utilized with embodiments herein. Incorporation by reference is discussed, for example, in MPEP section 2163.07(B).

All of the features disclosed, claimed, and incorporated by reference herein, and all of the steps of any method or process so disclosed, may be combined in any combination, except combinations where at least some of such features and/or steps are mutually exclusive. Each feature disclosed in this specification may be replaced by alternative features serving the same, equivalent or similar purpose, unless expressly stated otherwise. Thus, unless expressly stated otherwise, each feature disclosed is an example only of a generic series of equivalent or similar features. Inventive aspects of this disclosure are not restricted to the details of the foregoing embodiments, but rather extend to any novel embodiment, or any novel combination of embodiments, of the features presented in this disclosure, and to any novel embodiment, or any novel combination of embodiments, of the steps of any method or process so disclosed.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A structuring assembly for structuring water comprising a body portion, the body portion comprising a tubular first layer, wherein the tubular first layer defines an interior channel for passage of water and houses a plurality of structuring bodies positioned in the channel, the plurality of structuring bodies comprising nonmagnetic masses formed from a metal material, a dampening layer positioned about the first tubular layer, the dampening layer being separated from the interior channel by the first tubular layer such that the dampening layer is not exposed to the passage of water, and a tubular second layer positioned about the dampening layer, wherein, as water passes through the channel and over the plurality of structuring bodies, dissolved oxygen content of the water is increased.

2. The structuring assembly of claim 1, wherein the interior channel is defined by an inner surface of the first layer that is substantially cylindrical in shape.

3. The structuring assembly of claim 1, wherein the structuring bodies comprise a nonmagnetic solid stainless-steel material.

4. The structuring assembly of claim 1, wherein the dampening layer comprises a harmonic dampening material.

5. The structuring assembly of claim 4, wherein the harmonic dampening material is chosen from the group consisting of ground up granite, rock, shale, and mixtures thereof.

6. The structuring assembly of claim 1, wherein the dampening layer comprises a stainless-steel tube.

7. The structuring assembly of claim 1, wherein the tubular second layer is formed of stainless-steel or copper.

8. A water treatment system, the system comprising:
a water structuring assembly having an intake and an outlet and configured to pass a water flow along a passageway from the intake to the outlet, wherein the water structuring assembly comprises:
a body portion, the body portion having a first opening oriented toward the intake and a second opening oriented toward the outlet, wherein the body portion comprises a first tubular layer defining a channel coaxially aligned with the passageway and extending between the first and second openings of the body portion, a plurality of structuring bodies positioned in the channel, the plurality of structuring bodies comprising nonmagnetic masses formed from a metal material, a dampening layer positioned about the first tubular layer, the dampening layer being separated from the channel by the first tubular layer such that the dampening layer is not exposed to the water flow, and a tubular second layer positioned about the dampening layer; and
a pump configured to create the water flow between the intake and the outlet, wherein, as the water flow passes through the channel and over the structuring bodies, dissolved oxygen content of the water is increased.

9. The water treatment system of claim 8, wherein the structuring bodies comprise a nonmagnetic solid stainless-steel material.

10. The water treatment system of claim 8, wherein the dampening layer comprises a harmonic dampening material.

11. The water treatment system of claim 10, wherein the harmonic dampening material is chosen from the group consisting of ground up granite, rock, shale, and mixtures thereof.

12. The water treatment system of claim 8, wherein the dampening layer comprises a stainless-steel tube.

13. The water treatment system of claim 8, wherein the tubular second layer is formed of stainless-steel or copper.

14. A method of treating water, comprising:
receiving water through an intake of a water treatment system;
passing the water through a water structuring assembly, the water structuring assembly comprising a tubular first layer defining an interior channel for passage of the water and being wrapped with a dampening layer, the dampening layer being isolated from the passage of water by the first tubular layer such that the dampening layer is not exposed to the passing water, a plurality of structuring metal objects positioned in the interior channel, the plurality of structuring metal objects comprising nonmagnetic masses formed from a metal material, wherein the water passing through the interior channel of the tubular first layer passes around the structuring objects, and a tubular second layer positioned about the dampening layer; and
passing the water through an outlet of the water treatment system, wherein dissolved oxygen content of the water is increased.

15. The method of claim 14, wherein receiving water through the intake includes taking water from a natural body of water and passing the water through the outlet includes returning the water to the same natural body of water and wherein the nonmagnetic masses comprise a nonmagnetic solid stainless-steel material and the dampening layer comprises a harmonic dampening material comprising material chosen from the group consisting of ground up granite, rock, shale, and mixtures thereof.

* * * * *